Figure 1:
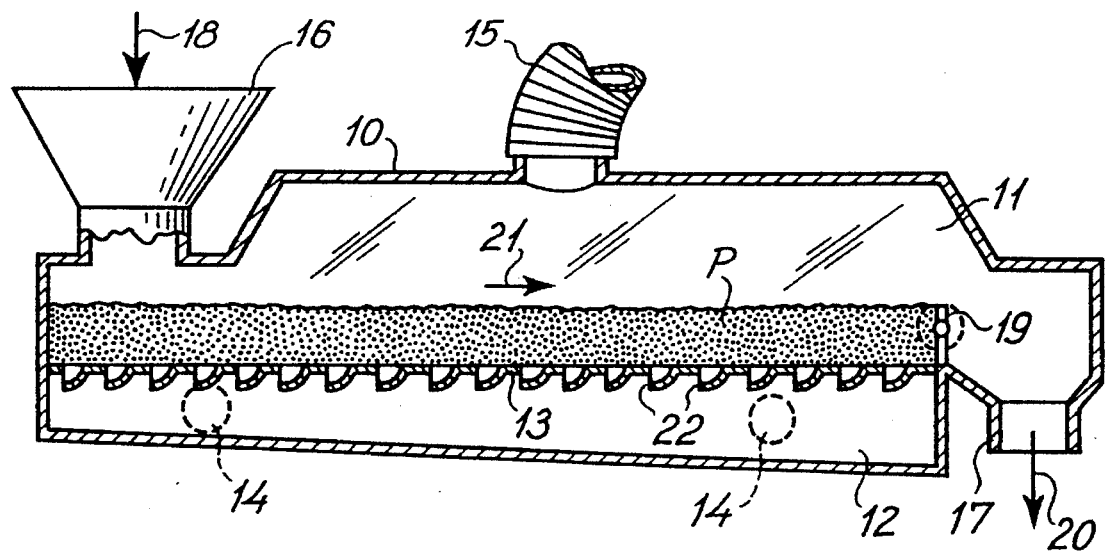

United States Patent [19]
Christensen

[11] Patent Number: 5,593,715
[45] Date of Patent: Jan. 14, 1997

[54] METHOD AND APPARATUS FOR TREATING A PULVERULENT OR PARTICULATE MATERIAL WITH GAS

[75] Inventor: Mogens A. Christensen, Virum, Denmark

[73] Assignee: Niro Holding A/S, Soborg, Denmark

[21] Appl. No.: 424,502

[22] PCT Filed: Sep. 30, 1993

[86] PCT No.: PCT/DK93/00317

§ 371 Date: Jul. 18, 1995

§ 102(e) Date: Jul. 18, 1995

[87] PCT Pub. No.: WO94/11098

PCT Pub. Date: May 26, 1994

[30] Foreign Application Priority Data

Nov. 19, 1992 [EP] European Pat. Off. .............. 92610080

[51] Int. Cl.$^6$ ................. A23C 1/00; F26B 3/00
[52] U.S. Cl. ................. 426/467; 34/360; 34/369; 34/582; 34/588; 426/468
[58] Field of Search .................... 426/467, 468; 34/360, 369, 576, 579, 582, 588; 99/474; 406/86, 88

[56] References Cited

U.S. PATENT DOCUMENTS 5,357,688 10/1994 Christensen ................. 34/360

*Primary Examiner*—George Yeung
*Attorney, Agent, or Firm*—Dennison, Meserole, Pollack & Scheiner

[57] ABSTRACT

A bed plate for a fluidized bed defines a plurality of substantially uniformly distributed openings therein for allowing fluidizing gas to flow upwardly through the plate. The openings are divided into pairs and directed and shaped so that the gas flows through the openings of each pair are directed in converging relationship, thereby to create a resultant flow component which is directed towards a discharging position of the fluidized bed. The desired resultant flow component may be obtained by properly selecting the direction and shape of the openings in each pair of openings. The gas flows through the openings in each pair may, for example, define an angle of 60° to 120° therebetween.

26 Claims, 2 Drawing Sheets

METHOD AND APPARATUS FOR TREATING A PULVERULENT OR PARTICULATE MATERIAL WITH GAS

The present invention relates to a method and apparatus for treating a pulverulent or particulate material or product with gas so as to fluidize the material.

Fluidized beds are used for drying and/or agglomerating particulate and powdered products, and they may be used as separate units, for example in connection with apparatus for spray drying milk products. The fluidized bed unit may then be used for further drying and/or agglomerating a moist powdered or particulate material produced in a spray dryer. The bed plate of the fluidized bed, which usually has a rectangular or another elongated shape, may be vibrated so as to contribute to the fluidization of the product being processed.

A fluidized bed may also be combined with a spray dryer so as to form an integrated unit. A liquid product to be dried may then be sprayed into a flow of hot drying gas which is directed from the upper end of a cylindrical drying chamber towards a fluidized layer of already spray dried particles arranged at the bottom end of the drying chamber, cf. U.S. Pat. No. 4,490,403. In a combined spray drying apparatus and fluidized bed of this type the bed plate normally has a circular or an annular shape and is normally stationarily mounted.

The gas distributing openings or perforations in the bed plate of the fluidized bed may be shaped so as to define fluidizing flows of drying gas having a flow component which is directed along the upper surface of the bed plate towards a product outlet of the fluidized bed, whereby deposits of product between the openings may be avoided. The flow component directed towards the product outlet also gives rise to a self-clearing or self-emptying effect. Bed plates having such gill type gas distributing openings are well known, vide for example U.S. Pat. Nos. 3,821,342 and 4,033,555.

Plug flow of the powdered or particulate product along the bed plate may be desirable. However, gas distributing openings of the gill type may cause the lower part of the fluidized product layer to be moved in the longitudinal direction of the elongated bed plate towards the product outlet at such a speed that the upper part of the fluidized layer tends to move in the opposite direction thereby creating an undesired back-mixing of the fluidized product. When the bed plate has a circular or annular shape and is mounted at the bottom end of a combined spray dryer and fluidized bed as mentioned above, the 9as distributing openings of the gill type are normally arranged so as to provide a circumferentially or tangentially directed flow component. This flow component causes a rotational movement of the fluidized product layer about the central axis of the bed plate, and it has been found that product particles or agglomerates, which have been formed by the spray drying process and which are present in the fluidized product layer, tend to disintegrate, when the rotational movement caused by the gill type openings in the bed plate becomes too pronounced. It is believed that the disintegration of the particles is caused by frictional forces acting between the particles, because the rotational speed of the particles in the fluidized layer decreases with increasing distance from the bed plate.

In an attempt to reduce the above disadvantages of a bed plate with gas distributing openings of the gill type it has been proposed to provide the bed plate with mutually parallel corrugations extending transversely to the direction of movement of the product layer along the plate as described in U.S. Pat. No. 4,305,210. Another solution which is described in Danish patent No. 149,737 involves the use of a bed plate having transversely extending sections with oppositely directed gas distributing openings of the gill type, or transverse sections with circular, punched openings and openings of the gill type, respectively. These latter bed plate structures do to some extent reduce the product back-mixing tendency in a fluidized bed.

U.S. Pat. No. 4,885,848 discloses a fluidized bed dryer comprising a bed plate with openings arranged in pairs of substantially oppositely directed openings, a depressed portion of the plate extending between the openings of each pair. Each depression may then be shaped so that the direction, the velocity, and/or the mass flow of the gas flows directed through the pair of openings defined at opposite sides of each depression are different so as to provide a resulting combined gas flow having a fluidizing flow component extending at right angles to the upper surface of the bed plate, and a transporting flow component extending along or parallel to the upper surface of the bed plate.

It has been found that a bed plate of the type disclosed in the above U.S. Pat. No. 4,885,848 is very sensitive to the flow conditions in the plenum chamber from which the fluidizing gas flows upwardly through the bed plate. This means that the flow pattern of the fluidizing gas flows is dependent not only on the pattern and shape of the openings in the bed plate and on the pressure in the plenum chamber, but also on the shape and volume of the plenum chamber and on the arrangement of the gas inlet or inlets to the plenum chamber.

EP-A-0474949 discloses another solution of the back-mixing problem. According to this solution, the bed plate of the fluidized bed is divided into elongated zones, and the types and/or patterns in adjacent zones are different so that the resulting flow components in these zones are oppositely directed or of different size, whereby the product transporting effect in the desired direction may be reduced.

The present invention provides a further method of treating a pulverulent or particulate material or product with gas, where the above problem has been solved in a different and rather simple manner.

The method according to the invention comprises feeding the material to a first position on a bed plate, directing streams or flows of gas upwardly through a plurality of openings in the bed plate so as to fluidize the material thereon, said plurality of openings being substantially uniformly distributed over at least a major part of the area of the bed plate, and each of the gas flows being directed through said plurality of openings having a flow component directed parallel with the plane of the bed plate and towards a second position on the bed plate spaced from said first position, moving the fluidized material along the bed plate in a general direction towards said second position, and discharging material from the bed plate at the second position, and the method according to the invention is characterized in dividing said plurality of openings into pairs and directing the gas flows through the openings of each pair in converging relationship so as to create a resultant flow component directed towards said second position.

As the mutually spaced, separate openings in each pair of openings are directed in converging relationship, the resultant flow component directed towards the second position may be chosen as desired by selecting a proper angle between the converging flow directions of the openings in each pair. Even though the angle between the converging flow directions may vary from one pair of openings to another, such angle is preferably substantially the same for all pairs of openings in the bed plate.

The openings in said plurality of openings may be of any type which may direct a fluidizing air flow therethrough having a flow component parallel with the plane of the bed plate. However, these openings are preferably of the so-called gill type.

In principle, the direction of the gas flows through each pair of openings may have flow components which in the plane of the bed plate define any angle therebetween exceeding 0° and being less than 180°. However, preferably such angle is 60°–120°.

The openings of said plurality of openings may be arranged in substantially parallel, mutually spaced first rows extending between said first and second positions of the bed plates, and each of the openings in a pair may then be positioned in either one of two adjacent rows. Such two adjacent first rows may then form a row of opening pairs, and the opening pairs in adjacent rows of opening pairs may be displaced in relation to each other in said general direction.

Said pairs of openings may be arranged in substantially parallel, mutually spaced second rows extending transversely to said first rows. The second rows may define any desired acute angle with the first rows. However, the first and second rows preferably extend at substantially right angles to each other.

Each of said second rows may comprise an opening in each of said first rows. Alternatively, adjacent second rows of openings may comprise pairs of openings from different first rows. Preferably, the pairs of openings are arranged in such a pattern that converging gas flows from a number of opening pairs are directed along each zone defined between two adjacent first rows of openings, such that product does not tend to collect in any of such zones. This may, for example, be obtained by directing the gas flows through successive openings of each of said first rows to opposite sides in relation to said general direction.

In order to also prevent product from collecting along outer rim zones or edge zones of the bed plate further openings may be defined in rim portions of the bed plate extending substantially in said general direction along opposite edges of the bed plate, each of said further openings being directed and shaped so as to provide a fluidizing gas flow having in the plane of the bed plate a flow component being directed towards the adjacent edge of the bed plate and defining together with said general direction an angle not exceeding 90°, preferably an acute angle of 30° –60°.

At least part of said further openings may be arranged in rows extending substantially parallel with said first rows of openings. Furthermore, said further openings may be positioned at opposite ends of said second rows.

According to another aspect the present invention relates to a bed plate or bed plate section of a fluidized bed defining a plurality of substantially uniformly distributed openings therein for allowing fluidizing gas to flow upwardly through the plate or section, each of the openings of said plurality of openings being directed and shaped so as to provide a fluidizing gas flow having a flow component directed parallel with the plane of the bed plate and in a predetermined general direction, and the bed plate or bed plate section according to the invention is characterized in that said plurality of openings are divided into pairs, and that the openings are directed and shaped so that the gas flows through the openings of each pair are directed in converging relationship so as to create a resultant flow component in said general direction.

According to a third aspect the present invention provides a fluidized bed dryer comprising a bed plate with at least one bed plate section defining a plurality of substantially uniformly distributed openings therein, means for feeding a pulverulent or particulate product to the bed plate, means for directing fluidizing gas flows upwardly through said openings so as to fluidize the product fed thereto, and means for discharging product from the bed plate, each of the openings in said plurality of openings being directed and shaped so as to provide a fluidizing gas flow having a flow component directed parallel with the plane of the bed plate towards said discharge means, and the fluidized bed dryer according to the invention is characterized in that said plurality of openings are divided into pairs and that the openings are directed and shaped so that the gas flows through the openings of each pair are directed in converging relationship so as to create a resultant flow component directed towards the discharge means.

Figure 2:
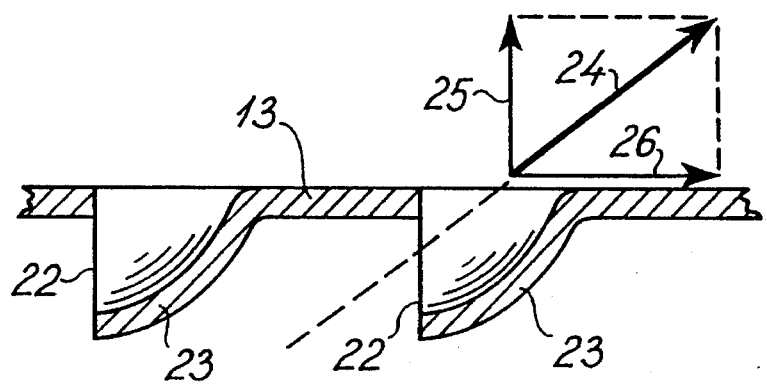
Figure 3:
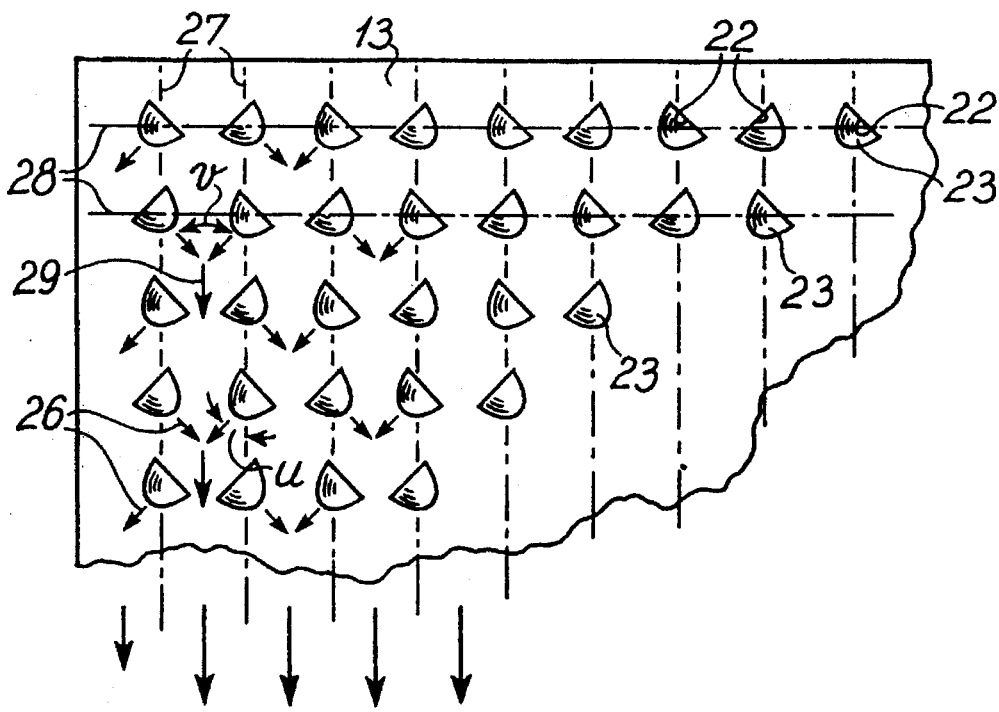
Figure 4:
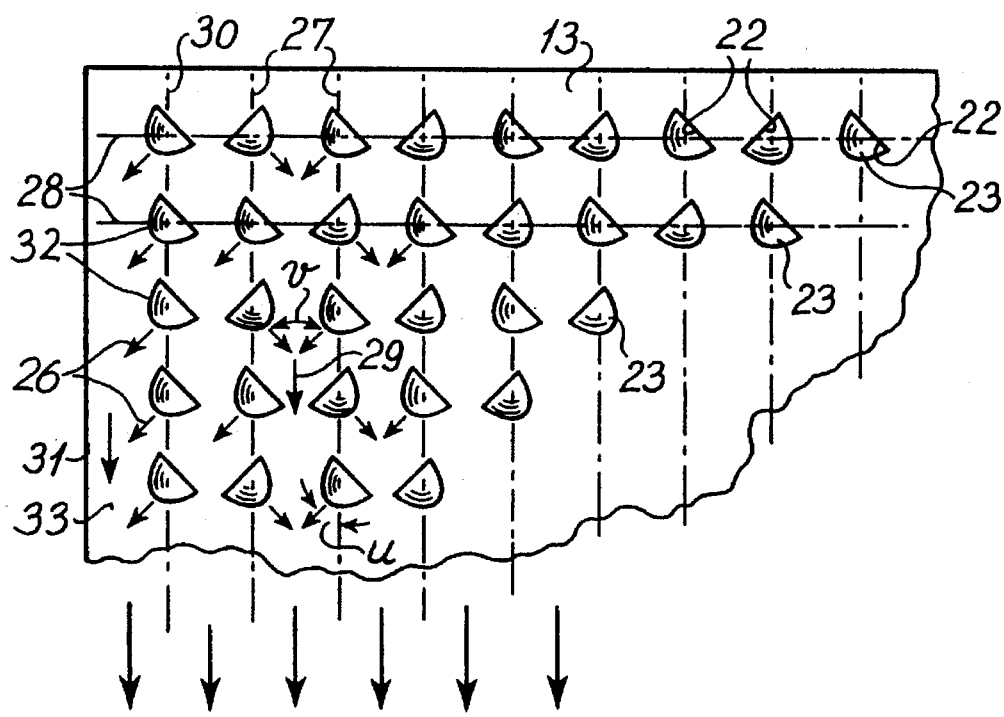

The invention will now be further described with reference to the drawings wherein FIG. 1 is a side view and partially sectional view of a drying apparatus with a fluidized bed and comprising a bed plate according to the invention, FIG. 2 shows in an enlarged scale a fractional and sectional view of a bed plate with openings of the conventional gill type, and FIGS. 3 and 4 are top plan views showing fractions of two different embodiments of a substantially rectangular bed plate according to the invention.

FIG. 1 shows a fluidized bed dryer which may, for example, be used for drying a partially dried and still moist powdered or particulate product, such as a milk product, or another food product. The moist product to be dried in the fluidized bed dryer may, for example, have been produced by a spray drying process. The fluidized bed dryer shown in FIG. 1 comprises an elongated housing 10 having an inner space divided into upper and lower cheers 11 and 12, respectively, by means of a perforated bed plate 13, which is fastened to the inner walls of the housing 10. Heated drying gas or air is supplied to the lower cheer or plenum cheer 12 of the housing 10 through gas inlets 14, and drying gas is exhausted from the upper chamber 11 of the housing through a gas exhaust conduit 15, which may, for example, be connected to a cyclone, not shown, from which the drying gas may be exhausted into the atmosphere. At one end, the housing 10 comprises a product inlet funnel 16, which opens into the upper chamber 11 defined above the perforated bed plane 13. At the other end the housing 10 has a product outlet 17, which also communicates with the upper chamber 11.

A moist powdered or particulate product P, which may, for example, be supplied from a conventional spray drying system and which has to be further dried, may be fed continuously to the product inlet 16 of the housing 10 as indicated by an arrow 18. Heated drying gas or drying air is supplied to the lower chamber 12 of the housing, and the heated gas flows upwardly through the perforations of the bed plate and into the upper chamber 11 so as to form a plurality of gas flows fluidizing the product P on the bed plate 13. The thickness or the height of the fluidized product layer is determined by the height of a movable damper or valve member 19 forming an overflow at the outlet end of the chamber 11. When a state of equilibrium has been obtained an amount of dried product corresponding to the amount of moist product supplied through the inlet funnel 16 will flow out through the product outlet 17 as indicated by an arrow 20 in FIG. 1. Thus, when the fluidized bed dryer is operating the fluidized product layer supported by the bed plate 13 is moved continuously from the inlet funnel 16 to the product outlet 17 as indicated by an arrow 21. When the operation of the fluidized bed dryer has to be closed down, the supply of moist product to the inlet funnel 16 is stopped, and thereafter the damper or valve 19 is moved to such a position that almost all of the product may flow from the bed plate 13 into the product outlet 17.

In order to ensure that no substantial residue of the product P remains on the bed plate when the damper 19 has been opened at least some of the perforations or gas distributing openings in the bed plate are formed so as to define upwardly directed fluidizing gas flows having a resulting horizontal flow component directed towards the product outlet 17. FIG. 2 shows a conventional bed plate having perforations or openings 22 of the so-called gill type. Such an opening may be made in a plate of sheet metal by cutting an incision or slit through the plate and by depressing the adjacent parts 23 at one side of the incision or slit. Such a bed plate with perforations or openings 22 of the gill type defines upwardly directed, inclined gas flows having a direction indicated by an arrow 24 in FIG. 2. As indicated, the gas flow 24 has a substantially vertically extending fluidizing flow component 25 and a substantially horizontally extending transporting flow component 26. When the transporting flow component 26 of the various perforations or openings of the gill type is directed towards the product outlet 17 any product residues are effectively removed from the bed plate 13, when the supply of product to the bed dryer has been stopped, and the damper 19 has been opened. Thus, a fluidized bed dryer with a bed plate having perforations or openings of the gill type may be made self-cleaning or self-clearing. The depressed parts 23 of the bed plate 13 may be directed downwardly as shown in the drawings so as to obtain a relatively smooth upper surface of the bed plate. Alternatively, the depressed parts 23 may be directed upwardly, if desired.

It has been found, however, that in fluidized bed dryers having a conventional bed plate with perforations or openings of the gill type, the efficiency of the transporting flow components 26 is too high so that the lower layers of the fluidized product P flow towards the product outlet 17, while the upper layers of the fluidized product flow in the opposite direction towards the product inlet 16. This causes an undesired back-mixing of the fluidized product P, whereby the residence time of the various particles of the fluidized product P on the bed plate can vary substantially.

FIGS. 3 and 4 are top plan views of bed plate sections, which means that these bed plates are viewed from their plane sides. The openings 22 in the bed plate 13 shown in FIG. 3 are all of the gill type. These openings are arranged in such a pattern that they define a plurality of mutually parallel, transversely spaced first rows 27 extending in the longitudinal direction of the rectangular bed plate 13 and a plurality of parallel, mutually spaced second rows 28 extending at substantially right angles to the first rows 27. The openings in each of the second rows 28 define pairs of openings which are directed such that the transporting flow components 26 of each pair are directed in converging relationship. The resultant 29 of the transporting flow components 26 of each pair of openings is directed substantially parallel with the first rows 27 and along the zone defined between the two first rows in which said pair of openings is positioned.

In FIG. 3, the angle defined between the converging transporting components 26 of the gas flows through each pair of openings 22 is designated v, while the acute angle defined between such transporting component 26 and the first rows 27 is designated u. The angle u is preferably between 30° and 60°, and correspondingly the angle v is preferably between 0° and 120°.

In order to obtain transporting flow components 26 directed along all of the zones defined between adjacent first rows 27 consecutive openings in each of said first rows 27 are preferably directed to opposite sides of the respective row.

FIG. 4 illustrates a modification of the embodiment shown in FIG. 3. A row 30 of further openings 32 of the gill type extends along each of oppositely arranged edges 31 of the bed plate 13. Each of the rows 30 extends between and substantially parallel with the adjacent edge 31 and the adjacent row 27 of openings. All of the gill openings 32 in each row 30 are uniformly directed towards the adjacent edge 31. The gill openings 32 in the row 30 tend to counteract that the movement of the fluidized product towards the product outlet 17 is retarded in a rim zone 33 extending along the edges 31 of the bed plate 13 during operation of the drying apparatus due to frictional forces. The openings in each of the rows 30 also prevent particulate product from settling in the rim zone 33, when supply of particulate product to the fluidized bed dryer through the inlet funnel 16 has been stopped and the damper or overflow plate 19 has been moved to such a position that the product may freely flow into the outlet 17. The openings 32 in the row 30 are preferably directed so that the transporting flow component 26 of each of the gas flows therethrough defines an acute angle with the row, for example substantially equal to the acute angle u, and such that the gas flows from the openings in the row 30 tend to blow particulate product from the rim zone towards the product outlet 20 as indicated by arrows in FIG. 4.

The bed plate 13 may comprise openings of different kinds. However, all of the openings are preferably of the same type and size. Furthermore, the angle v between the converging transporting flow component 26 may be different for different pairs. In the preferred embodiments, however, this angle is the same for all of the pairs of openings.

It should be understood that the resulting flow component for each pair of openings may be changed within a wide range by changing the angle v between the converging transporting flow components 26. The bed plate according to the invention may, for example, be produced by punching the openings 22 in sheet metal by means of a punching tool which may punch all of the opening 22 in one or more of said second rows 28 in a single blow. Alternatively, the bed plate may be produced by means of a computer operated punching tool punching the openings one by one in accordance with a preselected programme.

I claim:

1. A method of treating a pulverulent or a particulate material with gas, said method comprising:

feeding the material to a first position on a bed plate, directing a flow of gas upwardly through a plurality of gill-type openings in the bed plate so as to fluidize the material thereon, said plurality of openings being substantially uniformly distributed over at least a major part of the area of the bed plate, and the gas flow being directed through said plurality of openings having a flow component directed parallel with a plane including the bed plate and towards a second position on the bed plate spaced from said first position, said plurality of openings being divided into pairs and the gill-type opening being arranged so as to direct the gas flow through the openings each pair in converging relationship so as to create a resultant gas flow component directed toward the second position, moving the fluidized material along the bed plate in a general direction towards said second position, and discharging material from the bed plate at the second position.

2. A method according to claim 1, wherein gas flows through each pair of openings has flow components which define an angle of 60°–120° therebetween in the plane of the bed plate.

3. A method according to claim 1, wherein the openings of said plurality of gill-type openings are arranged in substantially parallel, mutually spaced first rows extending between said first and second positions of the bed plate.

4. A method according to claim 3, wherein said pairs of openings are arranged in substantially parallel, mutually spaced second rows extending transversely to and at substantially right angles to said first rows.

5. A method according to claim 4, wherein the gas flows through successive openings of each of said first rows are directed to opposite sides in relation to said general direction.

6. A method according to claim 1, wherein further openings are defined in rim portions of the bed plate extending substantially in said general direction along opposite edges of the bed plate, said method further comprising directing upwardly through each of said further openings a fluidizing gas flow the gas flow component of which in the plane of the bed plate is directed towards the adjacent edge of the bed plate and defines together with said general direction an angle not exceeding 90°.

7. A bed plate for a fluidized bed defining a plurality of substantially uniformly distributed gill-type openings therein for allowing fluidizing gas to flow upwardly through the plate or section, each of the openings of said plurality of openings being directed and shaped so as to provide a fluidizing gas flow having a flow component directed parallel with a plane including the bed plate and in a predetermined general direction, said plurality of openings being divided into pairs, and the gill-type openings being arranged and shaped such that the gas flows through the openings of each pair are directed in converging relationship so as to create a resultant flow component in said general direction.

8. A bed plate according to claim 7, wherein the openings in each pair of gill-type openings are arranged and shaped so that the directions of the gas flows therethrough define an angle of 60°–120° therebetween.

9. A bed plate according to claim 7, wherein the openings of said plurality of gill-type openings are arranged in substantially parallel, mutually spaced first rows extending in said general direction.

10. A bed plate according to claim 9, wherein said pairs of openings are arranged in substantially parallel, mutually spaced second rows extending transversely to said general direction.

11. A bed plate according to claim 10, wherein said second rows extend substantially at right angles to said general direction.

12. A bed plate according to claim 10, wherein the openings of said plurality of openings are arranged and shaped so as to direct the gas flows through successive openings of each of said first rows to opposite sides thereof.

13. A bed plate according to claim 7, wherein further openings are defined in rim portions of the bed plate extending substantially in said general direction along opposite edges of the bed plate, each of said further openings being directed and shaped so as to provide a fluidizing gas flow having in the plane of the bed plate a flow component being directed towards the adjacent edge of the bed plate and defining together with said general direction an angle not exceeding 90°.

14. A bed plate according to claim 13, wherein the angle defined is an acute angle of 30°–60°.

15. A bed plate according to claim 13, wherein the openings of said plurality are arranged in substantially parallel, mutually shaped first rows extending in said general direction, and at least part of said further openings are arranged in rows extending substantially parallel with said first rows of openings.

16. A bed plate according to claim claim 13, wherein the openings of said plurality are arranged in substantially parallel, mutually shaped first rows extending in said general direction, said pairs of openings are arranged in substantially parallel, mutually spaced second rows extending transversely and substantially at right angles to said general direction, and said further openings are positioned at opposite ends of said second rows.

17. A fluidized bed dryer comprising:
    a bed plate with at least one bed plate section defining a plurality of substantially uniformly distributed gill-type openings therein,
    means for feeding a pulverulent or particulate product to the bed plate,
    means for directing fluidizing gas flows upwardly through said openings so as to fluidize the product fed thereto, and
    means (19) for discharging product from the bed plate, each of the openings in said plurality of gill-type openings being directed and shaped so as to provide a fluidizing gas flow having a flow component directed parallel with a plane including the bed plate towards said discharge means said plurality of openings being divided into pairs and the gill-type openings being arranged and shaped such that the gas flows through the openings of each pair are directed in converging relationship so as to create a resultant flow component directed towards the discharge means.

18. A fluidized bed dryer according to claim 17, wherein the openings in each pair of gill-type openings are directed and shaped so that the gas flows therethrough define an angle of 60°–120° therebetween.

19. A fluidized bed dryer according to claim 17, wherein the openings of said plurality of gill-type openings are arranged in substantially parallel, mutually spaced first rows extending between the feeding means and the discharge means.

20. A fluidized bed dryer according to claim 19, wherein said pairs of openings are arranged in substantially parallel, mutually spaced second rows extending transversely to said first rows.

21. A fluidized bed dryer according to claim 20, wherein said second rows extend at substantially right angles to said first rows.

22. A fluidized bed dryer according to claim 20, wherein the openings of said plurality of gill-type openings are directed and shaped so as to direct the gas flows through successive openings of each of said first rows to opposite sides of the row.

23. A fluidized bed dryer according to claim 17, wherein further openings are defined in rim portions of the bed plated extending substantially in said general direction along opposite edges of the bed plate, each of said further openings being directed and shaped so as to provide a fluidizing gas flow having in the plane of the bed plate a flow component being directed towards the adjacent edge of the bed plate and defining together with said general direction an angle not exceeding 90°.

24. A fluidized bed dryer according to claim 23, wherein the angle defined is an acute angle of 30°–60°.

25. A fluidized bed dryer according to claim 23, wherein the openings of said plurality are arranged in substantially parallel, mutually spaced first rows extending between the feeding means and the discharge means, and at least part of said further openings are arranged in rows extending substantially parallel with said first rows of openings.

26. A fluidized bed dryer according to claim claim 23, wherein the openings of said plurality are arranged in substantially parallel, mutually spaced first rows extending between the feeding means and the discharge means, said pairs of openings are arranged in substantially parallel, mutually spaced second rows extending transversely to said first rows, and said further openings are positioned at opposite ends of said second rows.

* * * * *